(12) United States Patent
Hanada

(10) Patent No.: US 7,106,929 B2
(45) Date of Patent: Sep. 12, 2006

(54) WAVEGUIDE DEVICE

(75) Inventor: Tadahiko Hanada, Tokyo (JP)

(73) Assignee: NEC Corporation, Tokyo (JP)

( * ) Notice: Subject to any disclaimer, the term of this patent is extended or adjusted under 35 U.S.C. 154(b) by 189 days.

(21) Appl. No.: 10/370,115

(22) Filed: Feb. 21, 2003

(65) Prior Publication Data
US 2003/0169965 A1    Sep. 11, 2003

(30) Foreign Application Priority Data
Feb. 22, 2002    (JP)    ............... 2002-046324

(51) Int. Cl.
G02B 6/26    (2006.01)
G02B 6/42    (2006.01)
G02B 6/34    (2006.01)

(52) U.S. Cl. .................. 385/32; 385/37; 385/29

(58) Field of Classification Search .......... 385/24, 385/29, 32, 43, 131; 398/87, 141
See application file for complete search history.

(56) References Cited

U.S. PATENT DOCUMENTS

| 5,719,976 | A |   | 2/1998 | Henry et al. |   |
|---|---|---|---|---|---|
| 5,940,555 | A | * | 8/1999 | Inaba et al. | 385/24 |
| 6,069,990 | A | * | 5/2000 | Okawa et al. | 385/43 |
| 6,366,378 | B1 | * | 4/2002 | Tervonen et al. | 398/87 |
| 6,377,379 | B1 | * | 4/2002 | Bruno et al. | 398/141 |
| 6,580,862 | B1 | * | 6/2003 | Kominato et al. | 385/131 |
| 6,591,034 | B1 | * | 7/2003 | Albrecht et al. | 385/24 |
| 6,810,167 | B1 | * | 10/2004 | Tabuchi et al. | 385/24 |

FOREIGN PATENT DOCUMENTS

| JP | 03-225301 | 10/1991 |
|---|---|---|
| JP | 03-248107 | 11/1991 |
| JP | 04-030107 | 2/1992 |
| JP | 04-131806 | 5/1992 |
| JP | 05-323138 | 12/1993 |
| JP | 09-166716 | 6/1997 |
| JP | 09-230151 | 9/1997 |
| JP | 11-052158 | 2/1999 |
| JP | 11-248949 | 9/1999 |
| JP | 2001-235645 | 8/2001 |

OTHER PUBLICATIONS

Hiroshi Nishihara; Masamitsu Haruna; Toshiaki Suhara, *Optical Integrated Circuits*, Japan, Ohmsha, Ltd., Feb. 25, 1985, pp. 47-49.

* cited by examiner

Primary Examiner—Frank G. Font
Assistant Examiner—Mary El-Shammaa
(74) Attorney, Agent, or Firm—Foley & Lardner LLP

(57) ABSTRACT

Bent waveguide parts 131 and 132 on a substrate 121 of an arrayed waveguide chip 104 have a core dimension allowing multi-mode operation, but they are adapted to constitute higher order mode filters with adequate combination of the relation of the height and width of waveguides and the minimum radius of curvature. Thus, with the multi-mode as preamble it is possible to cut off higher order mode light propagation by setting a small minimum radius of curvature, thus realizing single-mode light propagation and reducing the optical coupling loss through optical fibers 111 and 112. Thus, it is possible to realize a waveguide chip and a waveguide device with the minimum radius of curvature of bent waveguides and less optical coupling loss in connection parts to optical fibers.

13 Claims, 3 Drawing Sheets

WAVEGUIDE DEVICE

BACKGROUND OF THE INVENTION

This application claims benefit of Japanese Patent Application No. 2002-046324 filed on Feb. 22, 2002, the contents of which are incorporated by the reference.

The present invention relates to waveguide devices, in which optical fibers are optically connected to waveguide elements such as AWG (arrayed waveguide grating) and Mach-Zehnder interferometer and, more particularly, to waveguide devices adapted to reduce or eliminate optical coupling loss in such optical connection parts.

Recent rapid growth in the traffic of the Internet or telecommunication network systems demands high transmission speed and large capacity in the trunk transmission systems, called backbones. DWDM (Dense Wavelength Division Multiplexing) systems, in which multiple optical signals in different wavelengths are multiplexed, are useful to build large capacity transmission systems. The DWDM systems use waveguide devices such as AWGs for processing optical signals for multiplexing and demultiplexing optical signals. Such waveguide devices use optical fibers connected to waveguides for inputting and outputting optical signals.

In optical fiber communication systems, single-mode fibers and multi-mode fibers are used. Multi-mode fibers are large in the core diameter, and have a multitude of light beams. In single-mode fibers, only a single light beam (or two light beams when polarization is taken into consideration) is present. The respective modes have different propagation constants. In multi-mode fibers, the signal transmits in a multitude of different modes, which have different propagation constants, whereby the signal is distorted at the receiving side due to arrival time fluctuations. Single-mode fibers are free from multi-mode dispersion, and thus single-mode fibers are used in long distance transmission to avoid signal distortion by multi mode dispersion.

Single-mode waveguides, which have high coupling efficiency to single-mode fibers, are thought to become more and more important for future increases in the capacity and wavelength of optical communication systems. Such single-mode waveguides are important as structural elements of high performance multiplexers/demultiplexers, modulators, branches, couplers, interferometers, etc.

Heretofore, in single-mode waveguide design, the cross-sectional structure of a straight waveguide is determined to prohibit higher order mode. Bent waveguides, which can change the light beam direction, are necessary for realization of functional waveguide devices. The small bending radius of curvature causes small waveguide devices by requiring smaller area to change the light beam direction. However, the small bending radius of curvature causes unwanted radiation loss at the outside of the waveguide in the bend. This loss is called bending loss.

The AWGs and Mach-Zehnder interferometers are waveguide devices, which require such bent waveguides. Thus, for size reduction of the devices, it is necessary to make the radius of curvature of the bent waveguide as small as possible with taking the relation of the size reduction to the bending loss into consideration.

The minimum radius of curvature of the bent waveguide has a correlation to refractive index difference between core and clad of the waveguide. In other words, it is possible to reduce the minimum radius of curvature when larger refractive index difference can be used. To make the minimum radius of curvature to be 5 mm or less, the refractive index difference should be very large compared to the single-mode fibers and the waveguide core dimension should be very small compared to the single-mode fibers for preventing the multi-mode excitation.

However, the core dimension reduction of waveguides makes the spot size of the waveguides at the optical connection to the optical fibers smaller than the spot size of the single-mode fibers. This causes unwanted coupling loss in the optical connection.

In order to solve the problem in the case of larger refractive index difference of the waveguide compared to that of the optical fibers, it is necessary to make the spot size of the waveguides substantially equal to the spot size of single-mode fibers at the optical connection by gradually changing the core dimension of the waveguide. However, gradually changing the core dimension of the waveguide requires additional regions in the waveguide devices. This causes a new problem that the waveguide chip tends to be increased in size.

FIG. 6 illustrates this problem. The Figure shows a waveguide device 201, which comprises a waveguide chip 203 having a bent waveguide 202 and optical fibers 206 and 207 optically connected to two connecting parts 204 and 205 in the waveguide chip 203. The bent waveguide 202 is of single-mode, and its spot size is thus small compared to the case of assuming the multi-mode case. This means that the connecting parts 204 and 205, which are provided at the optical connection for making the spot size of the waveguide substantially equal to the spot size of the optical fibers, should have relatively large length dimensions a and b in the optical axis direction. In other words, at least the lengths a and b should be added to the length c of the bent waveguide 202 in this direction as the length of one side of the waveguide chip 203.

SUMMARY OF THE INVENTION

An object of the present invention is to provide waveguide chips and waveguide devices, which have one or more bent waveguides, and which are small in size and are subject to less optical coupling loss at the optical connection to the optical fibers.

According to an aspect of the present invention, a waveguide chip has core dimension in which multiple modes are excited, and the waveguide chip has one or more bent waveguides having a radius of curvature capable of suppressing higher order mode propagation.

In this aspect, the waveguides have a core dimension, which permits multi-mode excitation, and have bent waveguides having a radius of curvature, which can suppress higher order mode propagation. The said bent waveguides cut off higher order mode propagation and provide a behavior like that of the single-mode waveguide. The core dimension of these waveguides thus can be made greater than the core dimension of a waveguide, which permits only single-mode excitation. Thus, even when the refractive index difference of the core and clad of the waveguide chip is increased, the core dimension need not be correspondingly reduced, which removes the unnecessary difference between the spot size of the waveguide and the spot size of the single-mode fibers. Furthermore, by increasing the refractive index difference, the minimum radius of curvature of the bent waveguides can be reduced. It is thus possible to reduce size of the waveguide chip.

According to another aspect of the present invention, a waveguide-device comprising; single-mode optical fibers; and a waveguide chip including optical fiber connection having a spot size substantially equal to the spot size of the single-mode optical fibers and allowing multi-mode excitation of the optical connection parts and optically connected to the single-mode optical fibers, and bent wave guide parts having a radius of curvature for suppressing higher order mode propagation.

Thus, the coupling loss with respect to the single-mode optical fiber can be reduced to the minimum radius of curvature of the bent waveguides. It is thus possible to reduce the size of the waveguide device.

The refractive index difference between the core and clad of the waveguide chip is higher than the refractive index difference between the core and clad of the single-mode optical fibers.

In this aspect, since the refractive index difference between core and clad of the waveguide chip is higher than those of the optical fibers, it is possible to reduce the size of the bent waveguides.

The refractive index difference is higher than 0.65%.

In this aspect, as the refractive index difference between the core and clad of the waveguide chip, an example of a value which is substantially equal to or higher than the refractive index difference between the core and clad of the waveguide chip. For instance, the refractive index difference may be 0.75%.

The waveguide device according to the above second aspect, wherein the core dimension of the waveguide chip for multi-mode excitation is different from the core dimension of the single-mode optical fibers other than the optical fiber connection parts, and the core dimension of the waveguide chip is changed continuously in the optical fiber connection parts.

In this aspect, where the waveguide chip and optical fibers connected thereto are different in the core dimension, in their connection parts the spot size are made to be substantially equal, and in the optical fiber connection parts the core dimensions of the waveguide chip are made to be continuously changed. In this way, the optical coupling loss in the connection parts can be reduced. Further, since the bent waveguides of the waveguide chips are of the multi-mode, unlike the single-mode case as shown in FIG. 6, it is possible to relatively increase the spot size of the waveguide. Thus, the length dimension of the connection parts in the optical axis direction can be correspondingly reduced, thus contributing to the size reduction of the waveguide chip.

A predetermined shift in a direction perpendicular to the optical axis at the transition between bent waveguide and straight waveguide is set.

In this aspect, in the waveguide chip, at the transition between bent waveguide and the straight waveguide, a predetermined shift is set in a direction perpendicular to the optical axis. Optical coupling loss between the bent waveguide and the straight waveguide is thus reduced.

The radius of curvature of the bent waveguides is changed continuously.

In this aspect, the radius of curvature of the bent waveguides is continuously changed. For example, sine or cosine curves are pertinent curves. Since the radius of curvature is changed continuously, less loss takes place in the part connected to the straight waveguide. The bent waveguide may have a constant radius of curvature. An example is what constitutes part of an arc.

The bent waveguides act as higher order mode filter for blocking higher order mode propagation.

In this aspect, the bent waveguides have a function as higher order mode filter for preventing higher order mode propagation. Owing to the presence of such bent waveguides, the waveguide chip can be dealt with in the single-mode.

The minimum radius of curvature of the bent waveguides is the minimum radius in a condition, in which the fundamental mode optical signals are transmitted while first and higher order mode optical signals be cut off.

In this aspect, when setting the minimum radius of curvature in the waveguide chip, it is possible to minimize the size of the bent waveguide by setting a minimum radius of curvature in a condition, in which fundamental mode optical signals are transmitted while cutting off first and higher order mode optical signals, thus contributing to the size reduction of the waveguide chip.

The minimum radius of curvature of the bent waveguides is the minimum radius in a condition, in which fundamental mode optical signals are transmitted while first and higher order mode optical signals be cut off.

In this aspect, when setting the minimum radius of curvature in the bent waveguides of the waveguide chip in the waveguide device, it is possible to minimize the size of the bent waveguides by setting a minimum radius of curvature in a condition, in which fundamental mode optical signals are transmitted while cutting off first and higher order mode optical signals, thus contributing to the size reduction of the waveguide chip.

The waveguide chip is an arrayed waveguide grating.

In this aspect, an arrayed waveguide grating is shown as an example of the waveguide chip of the waveguide device having bent waveguides.

The waveguide chip is a Mach-Zehnder interferometer.

In this aspect, a Mach-Zehnder interferometer is shown as an example of the waveguide chip of the waveguide device having bent waveguides. Other objects and features will be clarified from the following description with reference to attached drawings.

PREFERRED EMBODIMENTS OF THE INVENTION

Preferred embodiments of the present invention will now be described with reference to the drawings.

Figure 1:
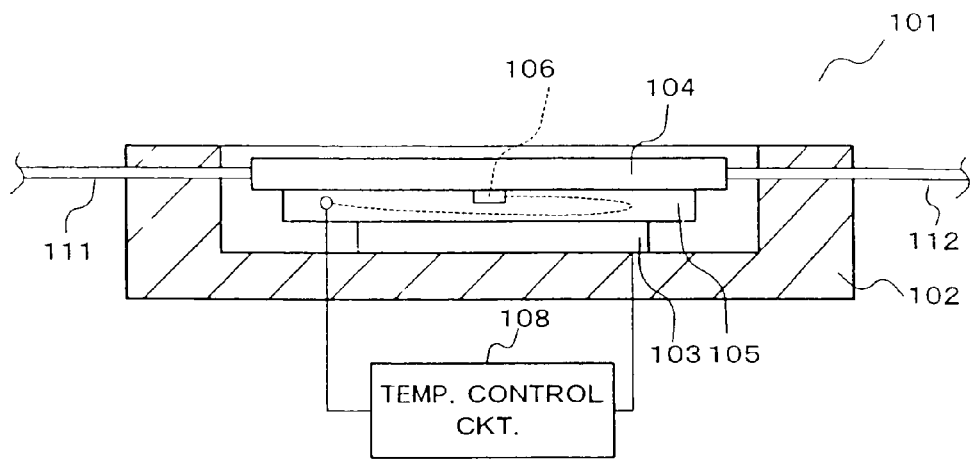
FIG. 1 shows an essential part of an arrayed waveguide grating module in a waveguide device as an embodiment of the present invention.

FIG. 1 shows essential parts of an arrayed waveguide grating module in a waveguide device as an embodiment of the present invention. The arrayed waveguide grating module comprises a boxing case 102, a temperature control element 103 constituted by a Peltier element mounted on the bottom of the case 102 for heating or cooling the module, an arrayed waveguide grating 104 and a metal plate 105 intervening between the components 103 and 104. The metal plate 105 is greater in size than the contact size of the temperature control element 103 for increasing the temperature control region of the temperature control element 103. A temperature sensor 106 is embedded in the metal plate 105. The temperature sensor 106 provides a temperature detection output, which is inputted to a temperature control circuit 108 for temperature control by the temperature control element 103.

Optical fibers 111 and 112 have one end thereto the opposite side of the arrayed waveguide grating 104 is connected. The other end (not shown) of the optical fibers 111 is connected to a light source (not shown), and the other end (also not shown) of the other optical fiber 112 is connected to a circuit part (not shown) for processing divided signal light beams.

Figure 2:
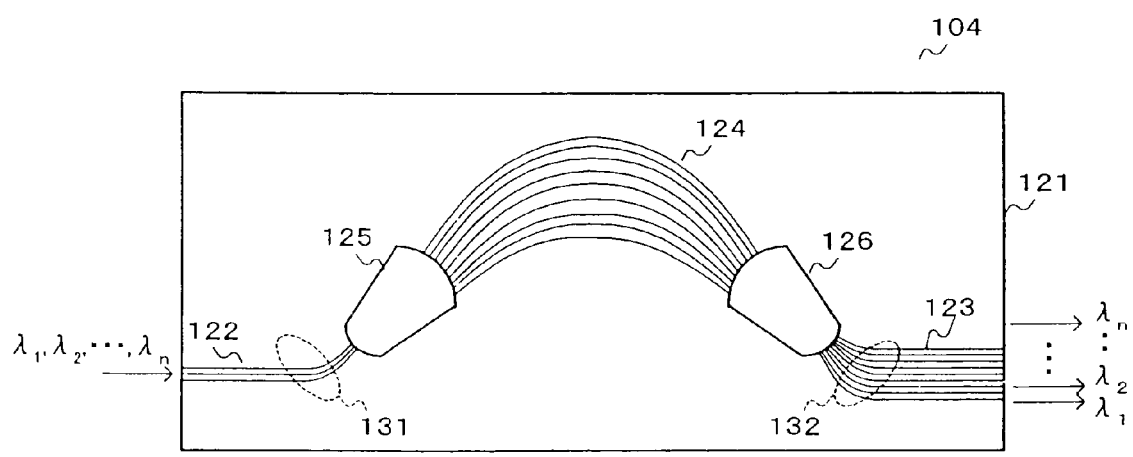
FIG. 2 shows part of the arrayed waveguide grating in the arrayed waveguide grating module shown in FIG. 1.

FIG. 2 shows the arrayed waveguide grating in the arrayed waveguide grating module shown in FIG. 1. The arrayed waveguide grating 104 is formed on a substrate 121, on which one or a plurality of first channel waveguides 122, a plurality of second channel waveguides 123, a channel waveguide array 124 constituted by a plurality of channel waveguides bent at different radii of curvature and tapered in the predetermined directions, a sector-shaped slab waveguide 125 connecting the first channel waveguide or waveguides 122 and the channel waveguide array 124, and another sector-shaped slab waveguide 126 connecting the channel waveguide array 124 and the second channel waveguides 123 are mounted.

Multiplexed optical signals of wavelengths λ1, λ2, . . . , λn which is or are incident from the first channel waveguide or waveguides 122 on the sector-shaped slab waveguide 125, is or are subjected to progress paths spreading out therethrough before being incident on the channel waveguide array 124. In the channel waveguide array 124, the constituent channel waveguides are arranged by their optical path lengths, where every channel waveguide is longer or shorter than the adjacent channel waveguide by a constant length difference (or waveguide length difference) ΔL. Thus, a constant phase shift can be achieved at the sector-shaped slab waveguide 126 between the light beams led through the every two adjacent constituent channel waveguides of the channel array 124. Actually, due to wavelength dispersion the equiphase surface is slanted depending on the wavelength. Independence on the wavelength, light beams are thus focused (or converged) on different positions on the interface between the second sector-shaped slab waveguide 126 and the plurality of second channel waveguides 123. Each channel waveguides which constitutes the second channel waveguides 123 are connected at the different positions corresponding to their input wavelengths, respectively, and it is thus possible to take out wavelength components λ1, λ2, . . . , λn independently, as desired, from the second channel waveguides 123.

This embodiment of the arrayed waveguide grating 104 uses a semiconductor (i.e., silicon substrate), as its substrate 121. This semiconductor is illustrative and not restrictive embodiment of the substrate 121. Silica material doped with phosphorus, germanium, titanium, boron, fluorine, etc. is deposited to a thickness of several tens of μm (micrometers) as a lower clad layer by a method such as FHD (Flame Hydrolysis Deposition), atmospheric pressure CVD (Chemical Vapor Deposition), spattering, spin coating or electron beam deposition on the semiconductor substrate 121 in this embodiment. On the lower clad layer, silica core layer which has dopant to realize higher refractive index than that of the lower clad layer is deposited to a thickness of 3 to 8 μm in the form of an optical waveguide.

The core pattern is formed using photolithography, and fine patterns are copied with an adequate mask material. Then, unnecessary areas are removed by dry etching method using an RIE (Reactive Ion Etching) apparatus or an RIBE (Reactive Ion Beam Etching) apparatus. Finally, the upper clad layer is deposited to a thickness of several tens of μm with silica material noted above with the refractive index thereof preset to be lower than that of the core layer.

In this embodiment of the arrayed waveguide grating module 101 shown in FIG. 1, the optical fibers 111 and 112 are both single-mode fibers, and in the arrayed waveguide grating 104 shown in FIG. 2 the first and second channel waveguides 122 and 123 and the channel waveguide array 124 are all constructed as multi-mode waveguides. The core (not shown) of the optical fiber or fibers 111 and the core (not shown) of the first channel waveguide or waveguides 122 are equal in the spot size, and the core (not shown) of the optical fiber or fibers 112 and the core (not shown) of the second channel waveguides 123 are also equal in the spot size. Thus, no substantial optical loss takes place at the optical connection parts of the optical fibers 111 and 112 to the substrate 121.

In the first and second channel waveguides 122 and 123, parts 131 and 132 of the bent waveguides and the part of the channel waveguide array 124, the radius of curvature of the waveguides is designed in order for the higher order modes of the lights excited in multi-mode to be transmitted to the clad layer. In the fundamental mode, this radius of curvature is so small in value as to be held within the core layer. Thus, the above parts 131, 132 and 124 of the bent waveguides provide single-mode functions although they provide multi-mode functions as core profile.

In other words, in this embodiment of the arrayed waveguide grating module 101, the arrayed waveguide grating 104 is designed such that a condition that higher order modes rise in its straight waveguide parts and also that the higher order modes are cut off in the bent waveguide localities. In effect, the arrayed waveguide grating 104 thus does not transfer higher order mode light signals. This will be described hereinunder in detail.

It is well known in the art the light loss $L_{oss}$ in the bent waveguides can be approximated as the following equation (1).

$$\text{Loss} = (A1 \times \exp(-A2 \times R) + A4) \times R + A3 \tag{1}$$

In the equation (1), R is the radius of curvature of the bent waveguides, and A1 and A2 are constant dependent on V parameters. A3 represents the scattered or absorption loss in the waveguides, and it has a fixed value. A4 represents a loss increase proportional to the bending. A2 is important when determining the light loss $L_{oss}$. A2 can be given as the following equation (2).

$$A_2 \approx \frac{2}{3} n_{core} k_0 \frac{\left(\sqrt{N_{eff}^2 - n_{clad}^2}\right)^3}{n_{core}^3} \tag{2}$$

In the equation (2), refractive index $n_{core}$ represents the refractive index of the core, and refractive index $N_{eff}$ represents equivalent refractive index of mode, and refractive index $n_{clad}$ represents the refractive index of clad. Wave number $k_0$ represents the wave number in vacuum.

The loss in the bent waveguides can be changed by controlling value A2R, i.e., the product of A2 in the equation (2) and the radius of curvature of the bent waveguides. Experiments prove that less loss results at the time of the bending in a mode, in which A2R is "10" or above. It is also proved that in a mode, in which A2R takes a value around "1", more loss results at the time of the bending, and light is cut off.

Figure 3:
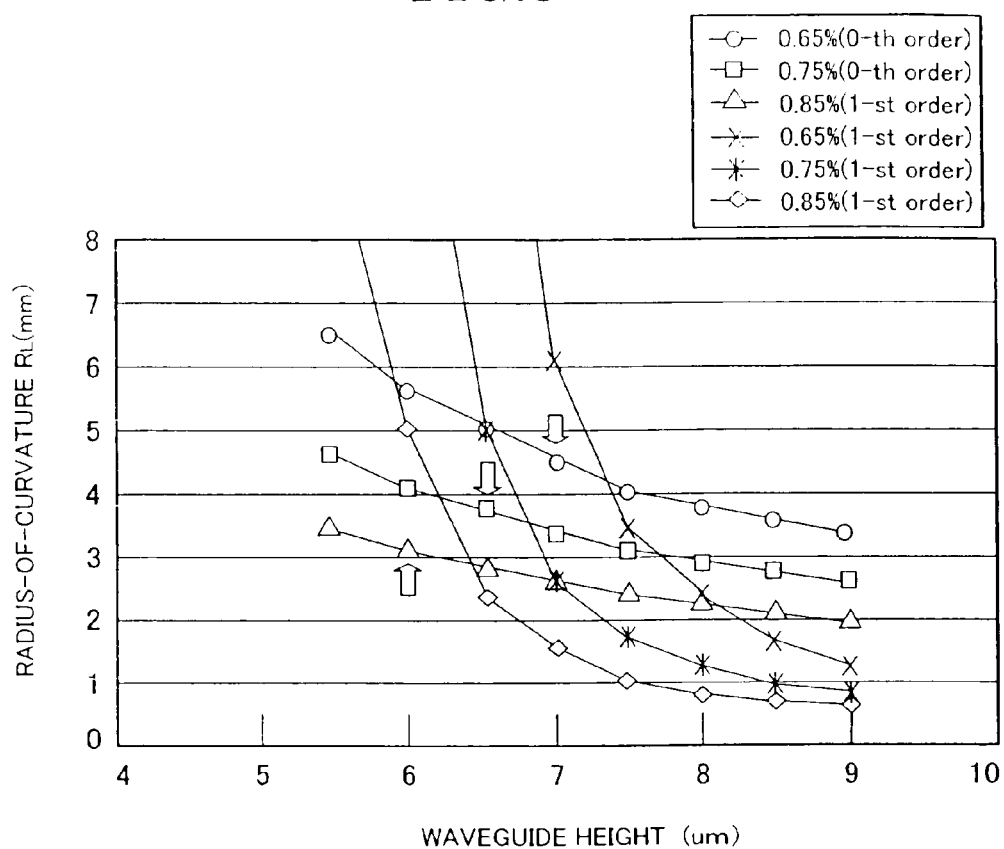
FIG. 3 shows height versus radius-of-curvature plots of waveguides produced by considering A2R.

FIG. 3 shows height versus radius-of-curvature plots of waveguides produced by considering A2R. In this case, it is assumed that the waveguides constituting the arrayed waveguide grating 104 are rectangular waveguides, in which the height and the width are equal. It is also assumed that less loss results in the fundamental mode as single-mode (with A2R of 11.5 as reference value) and that the first-order mode is cut off (with A2R of 1.28 as reference value).

Figure 4:
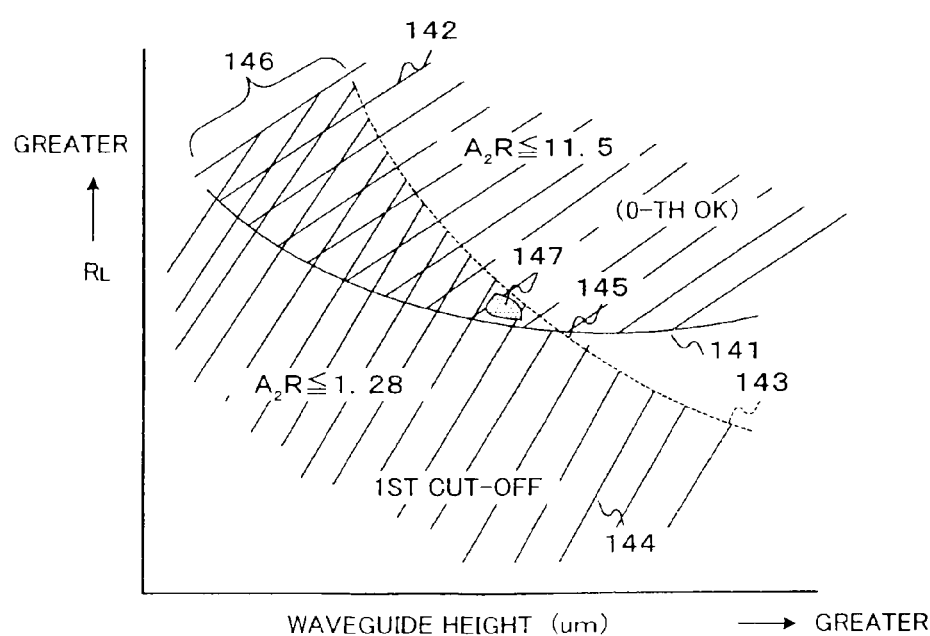
FIG. 4 is a graph showing a single example for explaining the way of reading FIG. 3.

FIG. 4 is a graph showing a single example for explaining the way of reading FIG. 3. In the graph, the ordinate is taken for the threshold radius $R_L$ of curvature. In the ordinate, the radius of curvature is greater in upper area. The abscissa is taken for the waveguide height when it is assumed that the waveguides are rectangular in form. Solid plot 141 represents the case with A2R of 11.5 in the fundamental mode. Thus, in a region 142 on the upper side of the plot 141 with A2R of 11.5 or above in the Figure, the waveguides transmit fundamental mode of light beams.

Dashed plot 143, on the other hand, represents the case with A2R of 1.28 in the first-order mode. Thus, in a region on the lower side of the plot 144, which is on the lower side of the plot 143 and with A2R of 1.28 or below, the waveguides cut off the first-order mode light beams.

In this embodiment, the waveguides formed on the substrate 121 shown in FIG. 2 are of a core dimension for multi-mode excitation, and the bent waveguide parts are adapted to cut off light beams in modes other than the fundamental mode (i.e., first, second, third and other higher order modes). Consequently, the array waveguide grating 104 transfers single-mode optical signals.

Referring to FIG. 4, fundamental mode light beams are transmitted in the region 142 over the plot 141 in FIG. 4, and the bent waveguides should satisfy the region. At the same time, the region 144 under the plot 143 should be satisfied to be able to cut off light beams in the first-order signals and other modes. In a region, which is above the intersection 145 between the two plots 141 and 143, and a region 146 sandwiched between the two curves 141 and 143 transmits only light beams in the fundamental mode and cuts off higher order mode light beams. In this embodiment, the bent waveguides, which meet the above conditions, have a function of filtering higher order mode light beams, and they are thus called bent higher order mode filters.

The bent higher order mode filter can be manufactured in the range of the region 146 in FIG. 4. In this embodiment, the radius of curvature of the bent waveguide is desirably as small as possible from the standpoint of the demand for size reduction of the arrayed waveguide grating 104. Thus, the smaller threshold-radius $R_L$ of curvature is the more suitable. Such an ideal condition is in a region, which is in the neighborhood of the intersection 145 and contained in the region 146, for instance a region 147. In such a region 147, the threshold radius $R_L$ of curvature is as small as possible, and the core dimension is large within this limit.

In FIG. 3, shown are characteristic curves corresponding to extents of transmission or cut-off in the fundamental and the first order modes. In the Figure, with respect to the fundamental mode, A2R is 11.5 as reference. With values above this value, fundamental mode (i.e. base mode) light beams are not cut off. With respect to the first order mode A2R is 1.28 as reference. With values less than this value, first order mode light beams are cut off. The parameters in the Figure are refractive index differences.

Thus, by using FIG. 3, single-mode operation is made with the bent waveguides so long as there is a region, which is over the fundamental mode plot and under the first order mode plot as described before in connection with FIG. 4. This is the bent higher order mode filter as described before.

In the mean time, in an operating region, in which higher order mode filters function as noted above, the single-mode operation is not always guaranteed with like refractive index difference and like cross-sectional shape straight waveguides. Where individual parts of the waveguide circuit are smoothly connected over the entire region in the waveguide preparation based on a design that multi-mode functions are straight waveguides, no disturbance is generated in the excitation and propagation of fundamental mode light bean from optical fiber. Under this condition, no inter-mode coupling takes place, and it is possible for waveguides, which have a large core dimension and are capable of providing multi-mode, to transfer fundamental mode light beam. Of course, in the case where such waveguide design is made, when a subtle axial deviation is present in the place of connection between optical fiber and waveguide, higher order mode excitation correspondingly takes place. In such higher order mode, undesired competition or interference of modes takes place inside the waveguide to deteriorate optical characteristics of optical system of the pertinent waveguide device or an optical system using this.

However, where a bent higher order mode filter is present in a part of the waveguide circuit, higher order mode light beams are cut off at that place. This phenomenon is utilized in the arrayed waveguide grating module 101 (FIG. 1) as this embodiment of the waveguide device, that is, the bent higher order mode filter is inserted to prevent excitation and propagation of higher order mode light beams in the arrayed waveguide grating chip 104. With the provision of a bent higher order mode filter in the neighborhood of a waveguide element substrate end, it is possible to increase the sensitivity of higher order mode loss due to axial deviation of the optical fiber and waveguide from each other and likewise prevent deterioration of optical characteristics of the waveguide device.

Arrows in FIG. 3 show places, where the threshold radius $R_L$ of curvature is suitable in design under the pertinent condition. It will be seen from the Figure that it is to be noted that the threshold radius $R_L$ of curvature reaches the neighborhood of 4 mm, which has been thought to be impossible in the prior art with the single-mode waveguide as preamble.

Figure 5:
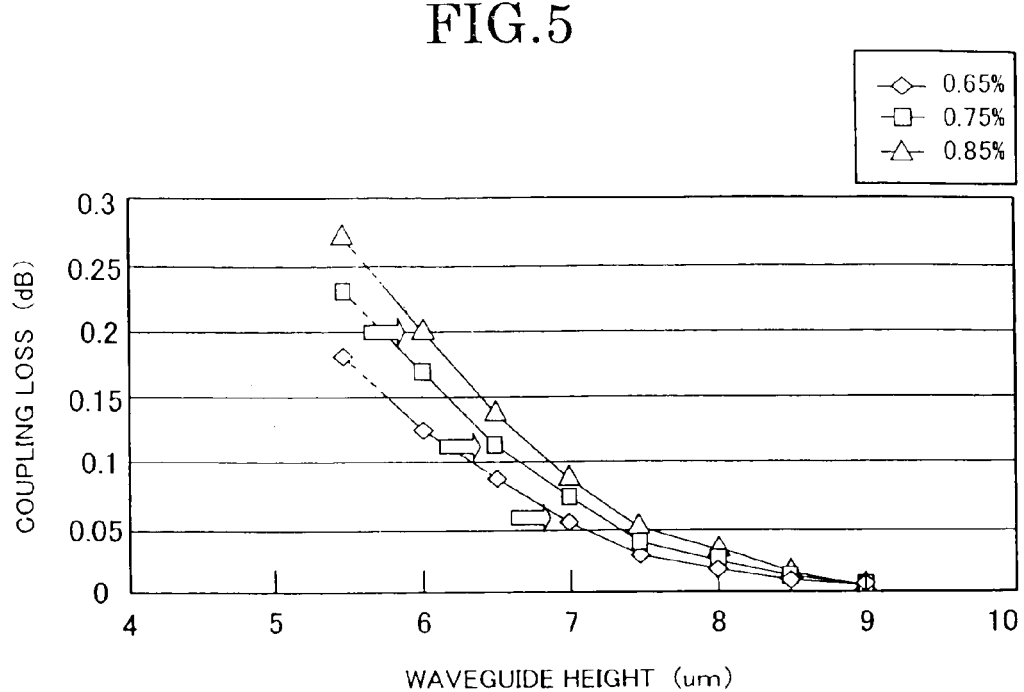
FIG. 5 shows an example of optical coupling loss characteristics with differences of the waveguide chip and the core dimension of optical fibers connected to the chip.
Figure 6:
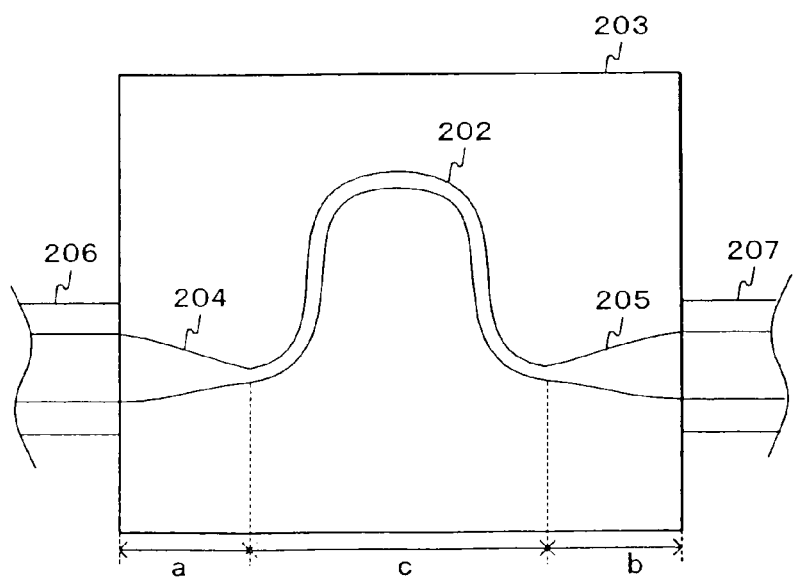
FIG. 6 illustrates the problem which occurs by gradually changing the core dimension of the waveguide chip, in return to providing the same spot size of the waveguide as the spot size of the optical fibers connected thereto at the optical connection in a waveguide device.

FIG. 5 shows an example of coupling loss characteristics with differences of the waveguide chip and the core dimension of optical fibers connected to the chip. In the Figure, the ordinate is taken for coupling losses with different core dimension of the first channel waveguide or waveguides 122 preset with respect to the optical fibers 111 shown in FIG. 1, and the abscissa is taken for the waveguide side core dimension. Again in this case, rectangular waveguides, the core of which has equal height and width, is assumed. It will be seen that with the core dimension shown by arrows in FIG. 3, the coupling loss is 0.2 dB (decibel) or below, and loss is not so much.

Compared to the case where single-mode waveguides are provided, it is possible to make the parts of changing the spot size unnecessary or reduce the length dimension of these parts in the optical axis direction.

Since the waveguide chip and the single-mode optical fibers are substantially equal in the spot size, it is possible to reduce or prevent optical loss in these parts. In addition, since bent waveguide parts having a radius of curvature capable of suppressing the higher order mode propagation, it is possible to suppress the multi-mode excitation.

Since the refractive index difference between core and clad of the waveguide chip is higher than that of single-mode optical fiber, it is possible to reduce the size of the bent waveguide.

Where the waveguide chip and the optical fibers connected thereto are different in the spot size, the spot size are made substantially equal in their connection parts, and also since in the optical fiber connection parts the core dimension of the waveguide chip is continuously varied, and it is thus possible to reduce the optical coupling loss in the connection parts. Also, since the bent waveguides of the waveguide chip satisfy the multi-mode, unlike the single-mode case, it is possible to relatively increase the spot size of the waveguide. Thus, the length dimension of the two connection parts in the optical axis direction can be relatively reduced to contribute to the size reduction of the waveguide chip.

Since a predetermined shift in a direction perpendicular to the optical axis at the transition between bent waveguide and straight waveguide is set, it is possible to compensate for the offset in the bent waveguide part and reduce optical loss.

Since the threshold radius of curvature of the bent waveguides in the waveguide chip is preset to the minimum radius in the region, in which fundamental light beams are transmitted while the first and higher order mode light beams are cut off, it is possible to minimize the size of the bent waveguides, thus contributing to the size reduction of the waveguide chip.

Changes in construction will occur to those skilled in the art and various apparently different modifications and embodiments may be made without departing from the scope of the present invention The matter set forth in the foregoing description and accompanying drawings is offered by way of illustration only. It is therefore intended that the foregoing description he regarded as illustrative rather than restrictive.

What is claimed is:

1. A waveguide chip, comprising:
   one or more waveguides;
   wherein each waveguide of said one or more waveguides has a core dimension such that multi-mode optical signals are excited therein; and
   wherein each waveguide of said one or more waveguides has a bent portion with a radius of curvature capable of suppressing propagation of higher order mode optical signals while allowing for transmission of optical signals in a fundamental mode.

2. The waveguide chip according to claim 1,
   wherein the radius of curvature of the bent portion of each waveguide of the plurality of waveguides is a minimum radius of curvature selected from a range of possible values in which fundamental mode optical signals are transmitted while first and higher order mode optical signals are cut off.

3. A waveguide chip, comprising:
   a substrate; and
   a plurality of waveguides formed on the substrate;
   wherein each of the plurality of waveguides has a core dimension such that multi-mode optical signals are excited; and
   wherein each of the plurality of waveguides has a bent portion defined by a minimum radius of curvature such that the bent portion suppresses higher order modes of propagation other than a single mode.

4. The waveguide chip of claim 3, wherein the single mode is a fundamental mode.

5. The waveguide chip of claim 3, wherein the waveguide chip is an arrayed waveguide grating.

6. The waveguide chip of claim 3, wherein the waveguide chip is a Mach-Zehnder interferometer.

7. The waveguide chip of claim 3, wherein each waveguide of the plurality of waveguides differs in length from an adjacent waveguide of the plurality of waveguides.

8. The waveguide chip of claim 3, wherein each waveguide of the plurality of waveguides differs in length from an adjacent waveguide of the plurality of waveguides by a constant length difference.

9. The waveguide chip of claim 3, wherein said radius of curvature of each waveguide of the plurality of waveguides is set such that higher order mode optical signals are transmitted to a clad layer of the waveguide while fundamental mode optical signals are held within a core layer of the waveguide.

10. An arrayed waveguide grating, comprising:
    a substrate;
    one or more first channel waveguides formed on the substrate;
    a plurality of second channel waveguides formed on the substrate;
    a channel waveguide array comprising a plurality of channel waveguides formed on the substrate;
    a first sector-shaped slab waveguide connecting the one or more first channel waveguides and the channel waveguide array; and
    a second sector-shaped slab waveguide connecting the channel waveguide array and the plurality of second channel waveguides;
    wherein each first channel waveguide of the one or more first channel waveguides has a core dimension such that multi-mode optical signals are capable of being excited therein;
    wherein each second channel waveguide of the plurality of second channel waveguides has a core dimension such that multi-mode optical signals are capable of being excited therein;
    wherein each channel waveguide of the plurality of channel waveguides of the channel waveguide array has a core dimension such that multi-mode optical signals are capable of being excited therein; and
    wherein each first channel waveguide of the one or more first channel waveguides has a part that is bent, each second channel waveguide of the plurality of second channel waveguides has a part that is bent, and each channel waveguide of the plurality of channel waveguides of the channel waveguide array is bent, such that only optical signals in a fundamental mode are transmitted from the one or more first channel waveguides to the plurality of second channel waveguides through the channel waveguide array while higher order mode optical signals are cut off.

11. The arrayed waveguide grating of claim 10,
    wherein a spot size of each first channel waveguide of the one or more first channel waveguides is substantially equal to a spot size of a single-mode fiber.

12. The arrayed waveguide grating of claim 10,
    wherein a spot size of each second channel waveguide of the plurality of second channel waveguides is substantially equal to a spot size of a single-mode fiber.

13. The arrayed waveguide grating of claim 10,
wherein a spot size of each first channel waveguide of the one or more first channel waveguides is substantially equal to a spot size of a single-mode fiber; and
wherein a spot size of each second channel waveguide of the plurality of second channel waveguides is substantially equal to a spot size of a single-mode fiber.

* * * * *